(12) United States Patent
Ikehara

(10) Patent No.: US 11,098,786 B2
(45) Date of Patent: Aug. 24, 2021

(54) VIBRATION APPLICATION MECHANISM AND VIBRATION CONTROL METHOD

(71) Applicant: HOSIDEN CORPORATION, Yao (JP)

(72) Inventor: Masayuki Ikehara, Yao (JP)

(73) Assignee: Hosiden Corporation, Yao (JP)

( * ) Notice: Subject to any disclaimer, the term of this patent is extended or adjusted under 35 U.S.C. 154(b) by 154 days.

(21) Appl. No.: 16/675,947

(22) Filed: Nov. 6, 2019

(65) Prior Publication Data

US 2020/0166099 A1 May 28, 2020

(30) Foreign Application Priority Data

Nov. 26, 2018 (JP) .............................. JP2018-220587

(51) Int. Cl.
*G06F 3/041* (2006.01)
*F16F 15/00* (2006.01)
*G06F 3/044* (2006.01)

(52) U.S. Cl.
CPC ............ *F16F 15/002* (2013.01); *G06F 3/044* (2013.01); *G06F 3/0414* (2013.01)

(58) Field of Classification Search
CPC ....... F16F 15/002; G06F 3/044; G06F 3/0414
See application file for complete search history.

(56) References Cited

U.S. PATENT DOCUMENTS

| 7,808,488 B2 * | 10/2010 | Martin ................... G06F 3/0338 345/169 |
| 8,384,687 B2 * | 2/2013 | Hisatsugu ............. G06F 3/0338 345/174 |
| 8,736,560 B2 * | 5/2014 | Pertuit .................... G06F 3/016 345/173 |
| 9,383,848 B2 * | 7/2016 | Daghigh ............... G06F 3/0412 |

(Continued)

FOREIGN PATENT DOCUMENTS

| JP | 2010146510 A | 7/2010 |
| JP | 2019087135 A | 6/2019 |
| WO | 2017145745 A1 | 8/2017 |

OTHER PUBLICATIONS

Extended European Search Report for European Application No. EP 19210607.8, published by the European Patent Office (EPO), dated May 6, 2020, including corresponding Communication, 3-page EPO Form 1703, European Search Report, Annex, and Information on Search Strategy.

*Primary Examiner* — Nay Tun
(74) *Attorney, Agent, or Firm* — Kilyk & Bowersox, P.L.L.C.

(57) ABSTRACT

A vibration application mechanism including a vibratable part, a load sensor to sense a load applied to the vibratable part, a vibration generator to vibrate the vibratable part, and a controller. The controller makes a first determination as to whether a load sensed by the load sensor has equaled or exceeded a first threshold value; if the first determination is such that the sensed load has equaled or exceeded the first threshold value, the controller drives the vibration generator and makes a second determination, during a predetermined period, as to whether a load sensed by the load sensor has fallen below a second threshold value, wherein the period starts when the sensed load has equaled or exceeded the first threshold value; and if the second determination is such that the sensed load has fallen below the second threshold value during the period, the controller does not drive the vibration generator.

18 Claims, 8 Drawing Sheets

(56) References Cited

U.S. PATENT DOCUMENTS

| | | | |
|---|---|---|---|
| 9,619,026 B2* | 4/2017 | Aono | G06F 3/016 |
| 10,013,094 B1* | 7/2018 | Smith | G06F 3/044 |
| 10,180,726 B2* | 1/2019 | Tsukamoto | G06F 3/016 |
| 10,664,056 B2* | 5/2020 | Matsumoto | G06F 1/1626 |
| 10,936,108 B2* | 3/2021 | Czelnik | B60R 11/0217 |
| 2010/0156818 A1* | 6/2010 | Burrough | G06F 3/041 |
| | | | 345/173 |
| 2011/0102358 A1* | 5/2011 | Aono | G06F 3/0414 |
| | | | 345/173 |
| 2011/0187651 A1* | 8/2011 | Whitlow | G06F 3/041 |
| | | | 345/173 |
| 2012/0019448 A1* | 1/2012 | Pitkanen | G06F 3/041 |
| | | | 345/173 |
| 2012/0105367 A1* | 5/2012 | Son | G06F 3/04883 |
| | | | 345/174 |
| 2013/0120265 A1* | 5/2013 | Horii | G06F 1/1616 |
| | | | 345/168 |
| 2015/0002416 A1* | 1/2015 | Koike | G06F 3/041 |
| | | | 345/173 |
| 2015/0022138 A1* | 1/2015 | Hsu | G06F 1/1684 |
| | | | 318/689 |
| 2015/0253851 A1* | 9/2015 | Oh | G06F 3/04883 |
| | | | 345/179 |
| 2016/0334912 A1* | 11/2016 | Protasio Ribeiro | G06F 3/0481 |
| 2016/0370909 A1 | 12/2016 | Wang et al. | |
| 2017/0031495 A1 | 2/2017 | Smith | |
| 2017/0168578 A1* | 6/2017 | Tsukamoto | G06F 3/02 |
| 2017/0255269 A1* | 9/2017 | Yang | G06F 3/041 |
| 2017/0285848 A1* | 10/2017 | Rosenberg | G06F 3/0416 |
| 2018/0101233 A1* | 4/2018 | Tsukamoto | G06F 3/16 |
| 2018/0348865 A1* | 12/2018 | Czelnik | B60K 37/06 |
| 2019/0018490 A1* | 1/2019 | Ullrich | G06F 3/04845 |
| 2019/0050073 A1 | 2/2019 | Murakami | |

* cited by examiner

STATE TRANSITION TABLE (PRE-STATE AND POST-STATE)

| PRE-STATE \ POST-STATE | START PSEUDO-STATE 0 | S0 (LOAD OFF) | S1 (LOAD ON) | S2 (LOAD OFF) | S3 (LOAD ON) | S4 (LOAD OFF) | S5 (LOAD ON) |
|---|---|---|---|---|---|---|---|
| START PSEUDO-STATE 0 | | | | | | | |
| S0 (LOAD OFF) | | | LOAD RISES TO EQUAL OR EXCEED 1ST THRESHOLD VALUE | | | | |
| S1 (LOAD ON) | | | | LOAD FALLS BELOW 2ND THRESHOLD VALUE (BEFORE OR UPON ELAPSE OF PERIOD P1) | PERIOD P1 ELAPSES | | |
| S2 (LOAD OFF) | | PERIOD P2 ELAPSES | LOAD RISES TO EQUAL OR EXCEED 1ST THRESHOLD VALUE (BEFORE OR UPON ELAPSE OF PERIOD P2) | | | | |
| S3 (LOAD ON) | | | | | | LOAD FALLS BELOW 2ND THRESHOLD VALUE | |
| S4 (LOAD OFF) | | PERIOD P2 ELAPSES | | | | | LOAD RISES TO EQUAL OR EXCEED 1ST THRESHOLD VALUE (BEFORE OR UPON ELAPSE OF PERIOD P2) |
| S5 (LOAD ON) | | | | | | LOAD FALLS BELOW 2ND THRESHOLD VALUE | |

Fig.5A

STATE TRANSITION TABLE (PRE-STATE AND EVENT)

| PRE-STATE \ EVENT | <None> | LOAD RISES TO EQUAL OR EXCEED 1ST THRESHOLD VALUE | PERIOD P1 ELAPSES | LOAD FALLS BELOW 2ND THRESHOLD VALUE | PERIOD P2 ELAPSES |
|---|---|---|---|---|---|
| START PSEUDO-STATE 0 | S0 | cannot happen | cannot happen | cannot happen | cannot happen |
| S0 (LOAD OFF) | cannot happen | FLAG = 1, VIBRATION GENERATOR ON<br>S1 | cannot happen | cannot happen | cannot happen |
| S1 (LOAD ON) | cannot happen | cannot happen | S3 | [BEFORE OR UPON ELAPSE OF PERIOD P1] S2 | cannot happen |
| S2 (LOAD OFF) | cannot happen | [BEFORE OR UPON ELAPSE OF PERIOD P2] S1 | cannot happen | cannot happen | FLAG = 0<br>S0 |
| S3 (LOAD ON) | cannot happen | cannot happen | cannot happen | FLAG = 0, VIBRATION GENERATOR ON, TIMER ON<br>S4 | cannot happen |
| S4 (LOAD OFF) | cannot happen | [BEFORE OR UPON ELAPSE OF PERIOD P2] S5 | cannot happen | cannot happen | S0 |
| S5 (LOAD ON) | cannot happen | cannot happen | cannot happen | TIMER ON<br>S4 | cannot happen |

Fig.5B

VIBRATION APPLICATION MECHANISM AND VIBRATION CONTROL METHOD

CROSS-REFERENCE TO RELATED APPLICATION

The present application claims priority under 35 U.S.C. §119 of Japanese Patent Application No. 2018-220587 filed on Nov. 26, 2018, the disclosure of which is expressly incorporated by reference herein in its entirety.

BACKGROUND OF THE INVENTION

Technical Field

The invention relates to vibration application mechanisms and vibration control methods.

Background Art

A conventional vibration application mechanism is disclosed in Japanese Unexamined Patent Application Publication No. 2010-146510, which corresponds to U.S. Patent Publication No. 2011/0102358. The vibration application mechanism includes a vibratable part (input part) subjected to a pressing operation by a detection object, such as a finger of a user or a stylus, a load sensor to sense a pressing load on the vibratable part, a vibration generator to vibrate the vibratable part, and a controller. When the load sensed by the load sensor meets a predetermined first criterion, the controller drives the vibration generator to vibrate the vibratable part, thereby imparting a tactile feel to the detection object as a feedback in response to the pressing operation.

SUMMARY OF INVENTION

The above conventional vibration application mechanism is configured such that the load sensor senses a load applied to the vibratable part, whereas the vibratable part is vibrated by the vibration generator. As such, vibration of the vibratable part itself causes changes in the load to be sensed by the load sensor. Such changes in load may cause the controller to erroneously actuate the vibration generator after driving the vibration generator to impart a tactile feel in response to the pressing operation.

The invention has been made in view of the above circumstances and provides a vibration application mechanism and a vibration control method capable of suppressing erroneous actuation of a vibration generator.

A vibration application mechanism according to an aspect of the invention includes a vibratable part, a load sensor to sense a load applied to the vibratable part, a vibration generator to vibrate the vibratable part, and a vibration controller.

The vibration controller may be configured such that the vibration controller makes a first determination as to whether or not a load sensed by the load sensor has equaled or exceeded a first threshold value; if the vibration controller determines, as a result of the first determination, that the load sensed by the load sensor has equaled or exceeded the first threshold value, then the vibration controller drives the vibration generator and makes a second determination, during a predetermined first period, as to whether or not a load sensed by the load sensor has fallen below a second threshold value, wherein the first period starts when the load sensed by the load sensor has equaled or exceeded the first threshold value; and if the vibration controller determines, as a result of the second determination, that the load sensed by the load sensor has fallen below the second threshold value during the first period, then the vibration controller does not drive the vibration generator.

The vibration application mechanism of this aspect suppresses an erroneous actuation of the vibration generator which would otherwise be caused by the vibration generator vibrating the vibratable part. More particularly, when the vibratable part is pressed, the vibration generator is driven to vibrate the vibratable part, and such vibration of the vibratable part may change the load to be sensed by the load sensor. However, even if such vibration changes the load during the first period to a value below the second threshold value, the vibration generator will not be driven.

The vibration controller may be further configured such that, if the vibration controller determines, as a result of the second determination, that the load sensed by the load sensor has fallen below the second threshold value during the first period, then the vibration controller makes a third determination, during a predetermined second period, as to whether or not a load sensed by the load sensor has equaled or exceeded the first threshold value, wherein the second period starts when the load sensed by the load sensor has fallen below the second threshold value; if the vibration controller determines, as a result of the third determination, that the load sensed by the load sensor has equaled or exceeded the first threshold value during the second period, then the vibration controller does not drive the vibration generator but returns its process to the second determination; and if the vibration controller determines, as a result of the third determination, that the load sensed by the load sensor does not equal or exceed the first threshold value during the second period, then after elapse of the second period, the vibration controller returns its process to the first determination.

The vibration application mechanism of this aspect further suppresses an erroneous actuation of the vibration generator which would otherwise be caused by the vibration generator vibrating the vibratable part. More particularly, even if the load sensed by the load sensor changes during the first period to fall below the second threshold value due to the vibration of the vibratable part, and then rise to equal or exceed the first threshold value during the second period, or such fall and rise of the load are repeated, the vibration generator will not be driven.

The vibration controller may be further configured such that, if the load sensed by the load sensor does not fall below the second threshold value during the first period but falls below the second threshold value after the first period has elapsed, then the vibration controller drives the vibration generator. The vibration application mechanism of this aspect allows the vibration generator to be driven and thereby vibrate the vibratable part when the load sensed by the load sensor has fallen below the second threshold value after elapse of the first period.

The vibration controller may be further configured such that, after elapse of the first period, the vibration controller makes a fourth determination, during a predetermined third period, as to whether or not a load sensed by the load sensor has equaled or exceeded the first threshold value, wherein the third period starts when the load sensed by the load sensor has fallen below the second threshold value; if the vibration controller determines, as a result of the fourth determination, that the load sensed by the load sensor has equaled or exceeded the first threshold value during the third period, then the vibration controller does not drive the vibration generator; and if the vibration controller determines, as a result of the fourth determination, that the load sensed by the load sensor does not equal or exceed the first threshold value during the third period, then after elapse of the third period, the vibration controller returns its process to the first determination.

The vibration application mechanism of this aspect further suppresses an erroneous actuation of the vibration generator which would otherwise be caused by the vibration generator vibrating the vibratable part. More particularly, after the first period has elapsed, the vibration generator is driven to vibrate the vibratable part. Also in this case, the load sensed by the load sensor may change due to the vibration of the vibratable part. However, even if, during the third period after the drive of the vibration generator, the load sensed by the load sensor changes due to the vibration of the vibratable part to equal or exceed the first threshold value, the vibration generator will not be driven.

The vibration controller may be further configured such that, if the vibration controller determines, as a result of the fourth determination, that the load sensed by the load sensor has equaled or exceeded the first threshold value during the third period, then the vibration controller makes a fifth determination as to whether or not a load sensed by the load sensor has fallen below the second threshold value; and if the vibration controller determines, as a result of the fifth determination, that the load sensed by the load sensor has fallen below the second threshold value, then the vibration controller does not drive the vibration generator but returns its process to the fourth determination.

The vibration application mechanism of this aspect further suppresses an erroneous actuation of the vibration generator which would otherwise be caused by the vibration generator vibrating the vibratable part. More particularly, After the first period has elapsed, the vibration generator is driven to vibrate the vibratable part. Also in this case, the load sensed by the load sensor may change due to the vibration of the vibratable part. However, even if, during the third period after the drive of the vibration generator, the load sensed by the load sensor changes due to the vibration of the vibratable part to rise to equal or exceed the first threshold value, and then falls below the second threshold value, or such rise and fall of the load are repeated, the vibration generator will not be driven.

The vibratable part may be configured to be pressed from a first direction side. In this case, the vibration generator may be configured to apply vibration to the vibratable part from a second direction side, the second direction being opposite to the first direction.

The load sensor may be arranged on the second direction side with respect to the vibratable part and may be configured to sense a load in the second direction applied to the vibratable part.

The first period may preferably be, but is not required to be, between, or equal to, 10 ms and 200 ms. The second period may preferably be, but is not required to be, between, or equal to, 10 ms and 200 ms. The third period may preferably be, but is not required to be, between, or equal to, 10 ms and 200 ms.

The vibratable part may include a vibratable plate, and a touch sensor directly or indirectly fixed to the vibratable plate. In this case, the vibration generator may be configured to vibrate the vibratable plate, and the load sensor may be configured to sense a load applied to the vibratable plate. The vibratable part may further include a cover panel fixed to the vibratable plate. The touch sensor may be fixed to the cover panel.

Alternatively, the vibratable part may be a touch sensor. In this case, the vibration generator may be configured to vibrate the touch sensor, and the load sensor may be configured to sense a load applied to the touch sensor. The vibratable part may further include a cover panel directly or indirectly fixed to the touch sensor.

In a vibration control method of an aspect of the invention, a load applied to a vibratable part is sensed by a load sensor and a vibration generator is configured to vibrate the vibratable part, and the vibration controller is configured to perform a process as in any of the above aspects.

BRIEF DESCRIPTION OF DRAWINGS

The present invention can be even more fully understood with the reference to the accompanying drawings which are intended to illustrate, not limit, the present invention.

FIG. 5A is a state transition table showing operating states of the vibration application mechanism of the first embodiment or its variant, specifically showing transitions before or after respective states S0 to S5.

FIG. 5B is a state transition table showing operating states of the vibration application mechanism of the first embodiment or its variant, specifically showing how events relate to processes performed in states S0 to S5 before the respective events.

DESCRIPTION OF EMBODIMENTS

Various embodiments of the invention will now be described.

First Embodiment

Figure 1:
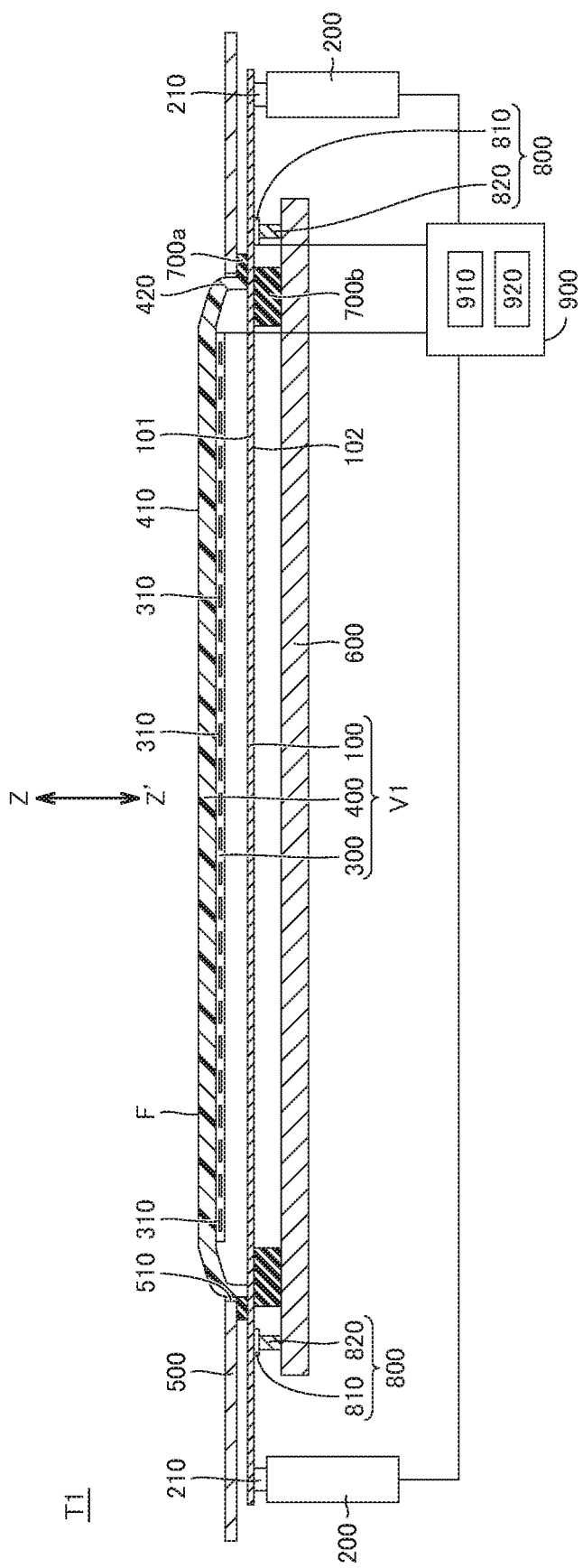
FIG. 1 is a schematic cross-sectional view of a vibration application mechanism according to a first embodiment of the invention.
Figure 2:
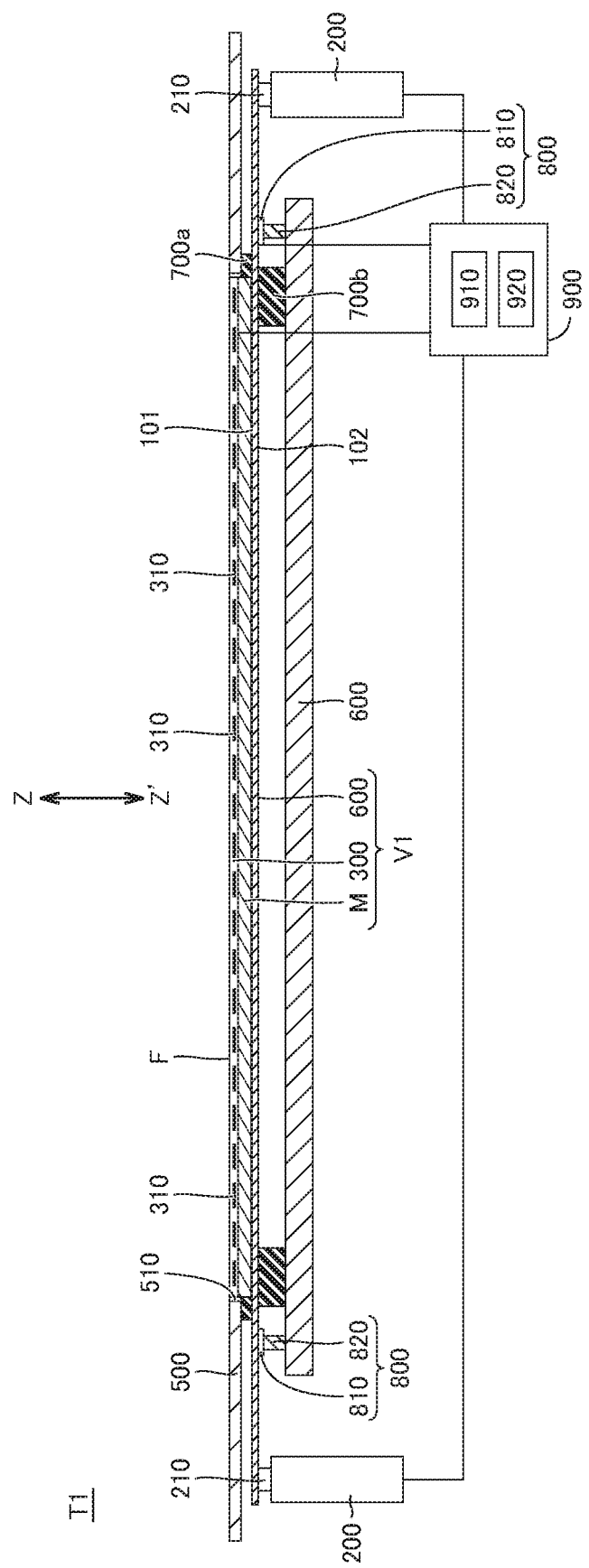
FIG. 2 is a schematic cross-sectional view of a variant of the vibration application mechanism of the first embodiment.

The following discussion is directed to a vibration application mechanism T1 according to various embodiments of the invention, including a first embodiment, with reference to FIGS. 1 and 2. FIG. 1 illustrates a vibration application mechanism T1 of the first embodiment, and FIG. 2 illustrates a variant thereof. FIGS. 1 and 2 show Z-Z' direction, in which the Z direction corresponds to the first direction in the claims, and the Z' direction corresponds to the second direction in the claims. The first and second directions are opposite to each other.

The vibration application mechanism T1 includes a vibratable part V1 and at least one vibration generator 200. The vibratable part V1 may include a vibratable plate 100.

The vibratable plate 100 may be a metal plate, for example, and has a first face 101 on the Z-direction side and a second face 102 on the Z'-direction side. The Z-Z' direction is the direction in which the vibratable plate 100 vibrates (reciprocatingly moves).

The at least one vibration generator 200 may only be configured to vibrate the vibratable plate 100 in the Z-Z' direction. The at least one vibration generator 200 may specifically have one of the following configurations (A) to (C), for example.

(A) The or each vibration generator 200 is an electromagnetic solenoid including a plunger 210 and a coil (not shown). In this configuration, the or each vibration generator 200 may preferably be located on the Z'-direction side (as illustrated in FIG. 1), or on the Z-direction side, with respect to the vibratable plate 100. When the coil is exited, the plunger 210 thereby moves reciprocatingly in the Z-Z' direction and repeatedly presses the vibratable plate 100 from the Z'- or Z-direction side, so that the or each vibration generator 200 provides vibration in the Z-Z' direction to the vibratable plate 100.

(B) The or each vibration generator 200 is a vibration motor including a motor and a plunger. Also, in this configuration, the or each vibration generator 200 may preferably be located on the Z'- or Z-direction side with respect to the vibratable plate 100. When the motor is driven, the plunger 210 thereby moves reciprocatingly in the Z-Z' direction and repeatedly presses the vibratable plate 100 from the Z'- or Z-direction side, so that the or each vibration generator 200 provides vibration in the Z-Z' direction to the vibratable plate 100.

(C) The or each vibration generator 200 is a vibrating element using a shape-memory alloy wire. Also, in this configuration, the or each vibration generator 200 may preferably be located on the Z'- or Z-direction side with respect to the vibratable plate 100. Utilized as a plunger, the shape-memory alloy wire vibrates in the Z-Z' direction (i.e. moves reciprocatingly in the Z-Z' direction) and repeatedly presses the vibratable plate 100 from the Z'- or Z-direction side, so that the or each vibration generator 200 provides vibration in the Z-Z' direction to the vibratable plate 100.

There may be provided a plurality of vibration generators 200 having any one of, or a combination of, configurations (A) to (C) described above. The plurality of vibration generators 200 may preferably be, but is not required to be, spaced apart from each other.

The vibratable part V1 may further include an operation panel 400. The operation panel 400 may be made of a plastic material, such as polymethyl methacrylate (PMMA) or polycarbonate (PC). Alternatively, the operation panel 400 may be a single plate or film, or a plurality of plates or films, of a plastic material or a polymer alloy selected from polycarbonate (PC), polystyrene (PS), cycloolefin copolymer (COC), cycloolefin polymer (COP), polymethyl methacrylate (PMMA), polypropylene (PP), etc.

The operation panel 400 may include a panel body 410. The panel body 410 is a plate having an operation face F. The operation face F is an outer face on the Z-direction side of the panel body 410. The operation face F is touched and pressed from the Z-direction side by a detection object, such as a user's finger or a stylus, to be subjected to a touch input operation by the detection object. The operation face F may be entirely or partly flat and/or entirely or partly curved. The panel body 410 may further have a fixing face. The fixing face is an inner face on the Z'-direction side of the panel body 410. The operation panel 400 may further include a leg 420. The leg 420 is a tube extending in the Z' direction from the peripheral edge of the panel body 410. As illustrated in FIG. 1, the leg 420 of the operation panel 400 is fixed to the first face 101 of the vibratable plate 100 with screws, a double-sided adhesive, or other means. Since the operation panel 400 is thus fixed to the vibratable plate 100, the operation panel 400 is able to vibrate (reciprocatingly move) in the Z-Z' direction together with the vibratable plate 100. Also, when the operation face F of the operation panel 400 is pressed with a certain load in the Z' direction, the load is applied to the vibratable plate 100 through the operation panel 400. When the operation panel 400 vibrates, the operation face F accordingly vibrates in the Z-Z' direction so as to impart therethrough a tactile feel to a detection object. The leg 420 can be omitted, in which case the panel body 410 may preferably be fixed to the first face 101 of the vibratable plate 100 with screws, a double-sided adhesive, or other means.

The vibratable part V1 may further include a capacitive touch sensor 300. The touch sensor 300 may be fixed to the fixing face of the operation panel 400 such as to be located on the Z'-direction side relative to the operation face F of the operation panel 400 (see FIG. 1). Alternatively, the touch sensor 300 may be provided inside the operation panel 400, more particularly may be held between plastic plates or films of the operation panel 400 or insert-molded in the operation panel 400, for example. In any case, the touch sensor 300 is fixed to the vibratable plate 100 indirectly via the operation panel 400 and is therefore able to vibrate (reciprocatingly move) in the Z-Z' direction together with the vibratable plate 100 and the operation panel 400.

The touch sensor 300 includes a plurality of electrodes 310. The electrodes 310 may be arranged on a single plane, at spaced intervals in plan view of the operation face F of the operation panel 400 from the Z-direction side (this view may be hereinafter referred to simply as a plan view), as shown in FIG. 1. Alternatively, the electrodes 310 may include a first set of electrodes 310 arranged at spaced intervals on a first plane and a second set of electrodes 310 arranged at paced intervals on a second plane. The first set of electrodes 310 may intersect the second set of electrodes 310 in plan view. The first and second planes extend at different heights in the Z-Z' direction.

In any of these cases, the touch sensor 300 may have a configuration (a) or (b) below.

(a) When a detection object touches the operation face F and approaches at least one of the electrodes 310, there is a change in electrostatic capacitance between the approached electrode(s) 310 and the detection object. The change in electrostatic capacitance changes an output signal(s) (voltage or current) from the approached electrode(s) 310.

(b) The electrodes 310 includes at least one pair of adjacent or intersecting electrodes 310 in plan view, and the or each pair consists of a drive electrode (Tx electrode) and a detection electrode (Rx electrode) electrostatically coupled to each other. When a detection object touches the operation face F and approaches the at least one pair of the adjacent or intersecting electrodes 310 (drive electrode(s) and detection electrode(s)), there is a change in electrostatic capacitance between the approached drive electrode(s) and the corresponding detection electrode(s). The change in electrostatic capacitance changes an output signal(s) (voltage or current) from the approached detection electrode(s).

In another aspect, the vibratable part V1 may include the vibratable plate 100 and the touch sensor 300, with the operation panel 400 omitted. In this case, the face on the Z-direction side of the touch sensor 300 serves as the operation face F. The touch sensor 300 may be fixed to the first face 101 of the vibratable plate 100, indirectly via an intermediate member M (see FIG. 2), or directly with a double-sided adhesive or the like (not shown). In either case, the touch sensor 300 vibrates (reciprocatingly moves) in the Z-Z' direction together with the vibratable plate 100, and when the operation face F of the touch sensor 300 is pressed with a certain load in the Z' direction, the load is applied to the vibratable plate 100 through the touch sensor 300.

On the Z'-direction side of the touch sensor 300 of any of the above aspects, there may be provided a display device, such as an organic electroluminescent display (OLED) or a liquid crystal display. In this case, the vibratable plate 100 may have an opening at a portion on the Z'-direction side relative to the touch sensor 300, so that the touch sensor 300 may face the display device. No such opening is not needed in the vibratable plate 100 where no display device is provided. Also, where no display device is provided, the touch sensor 300 may be fixed directly on the first face 101 of the vibratable plate 100 such as to be located on the Z'-direction side relative to the operation face F of the operation panel 400. In this case, the touch sensor 300 vibrates (reciprocatingly moves) in the Z-Z' direction together with the vibratable plate 100.

The vibration application mechanism T1 may further include a housing 500 and/or a fixing plate 600. The housing 500 has an opening 510. Where the vibratable part V1 includes the operation panel 400, the size of the opening 510 is slightly greater than that of the operation panel 400 in plan view (see FIG. 1), so that the opening 510 accommodates the operation panel 400. In other words, the operation panel 400 is exposed to the outside of the housing 500 through the opening 510. Where the vibratable part V1 does not include the operation panel 400, the size of the opening 510 is slightly greater than that of the touch sensor 300 in plan view (see FIG. 2), so that the opening 510 accommodates the touch sensor 300. In other words, the touch sensor 300 is exposed to the outside of the housing 500 through the opening 510. Where the housing 500 is omitted, the operation panel 400 or the touch sensor 300 may be exposed through an opening in a housing of an electronic device that incorporates the vibration application mechanism T1.

The fixing plate 600 is a plate of metal, or of a plastic material, such as polymethyl methacrylate (PMMA), polycarbonate (PC), polybutylene terephthalate (PBT), an ABS resin. The fixing plate 600 is disposed on the Z'-direction side relative to, and in spaced relation to, the second face 102 of the vibratable plate 100.

The vibration application mechanism T1 may further include a cushioning member 700a and/or a cushioning member 700b to hold the vibratable plate 100 in the Z-Z' direction. The cushioning members 700a and 700b are loop-shaped elastic bodies made of silicone rubber, urethane rubber, other rubber, foaming material, or the like material. The cushioning member 700a is interposed between the vibratable plate 100 and the housing 500 in the Z-Z' direction. The cushioning member 700b is interposed between the vibratable plate 100 and the fixing plate 600 in the Z-Z' direction. The cushioning member 700a may consist of a plurality of pieces arranged at intervals along the circumferential direction of the cushioning member 700a to be located between the vibratable plate 100 and the housing 500. The cushioning member 700b may also consist of a plurality of pieces arranged at intervals along the circumferential direction of the cushioning member 700b to be located between the vibratable plate 100 and the fixing plate 600. The cushioning member 700a may be omitted, in which case the vibratable plate 100 may be fixed to the housing 500, directly or indirectly via an intermediary member. The cushioning member 700b may be omitted together with the fixing plate 600.

The vibration application mechanism T1 further includes at least one load sensor 800. The at least one load sensor 800 may only be configured to sense a load in the Z' direction applied onto the vibratable plate 100 of the vibratable part V1 and to output a signal (hereinafter referred to as an "output signal") or change the output signal in level (e.g. change the voltage of the signal) in accordance with the sensed load. More specifically, the at least one load sensor 800 may raise the output signal in accordance with the increase of the sensed load and lower the output signal in accordance with the decrease of the sensed load.

The at least one load sensor 800 may have the following configuration (1) or (2), for example:

(1) The at least one load sensor 800 is interposed in the Z-Z' direction between the vibratable plate 100 and the fixing plate 600 (see FIGS. 1 and 2). The or each load sensor 800 includes a pressure-sensing element 810 and a pin 820. The pressure-sensing element 810 and the pin 820 may be arranged to be in contact respectively with the vibratable plate 100 and the fixing plate 600, or respectively with the fixing plate 600 and the vibratable plate 100. In either case, when the vibratable part V1 is pressed in the Z' direction and the vibratable plate 100 moves in the Z' direction, the pressure-sensing element 810 and the pin 820 are pressed by and between the vibratable plate 100 and the fixing plate 600. The pin 820 in turn applies a pressure to the pressure-sensing element 810, and this pressure will become the load applied to the operation panel 400. The pressure-sensing element 810 is configured to change (raise or lower) an output signal in level in accordance with the pressure on the pressure-sensing element 810. The at least one load sensor 800 may be interposed in the Z-Z' direction between the vibratable plate 100 and other element of the vibration application mechanism T1 than the fixing plate 600.

(2) The or each load sensor 800 is a strain gauge sensor or the like and is fixed to the vibratable plate 100. The at least one load sensor 800 is configured to output or change (raise or lower) an output signal in level in accordance with a load in the Z' direction applied to the vibratable plate 100 when the vibratable part V1 is pressed in the Z' direction. With the at least one load sensor 800 of such configuration, the fixing plate 600 may be omitted.

As described above, the vibration application mechanism T1 is configured such that a load applied to the vibratable plate 100 of the vibratable part V1 is sensed by the at least one load sensor 800, and that the vibratable plate 100 is vibrated by the at least one vibration generator 200. As such, when a detection object touches (presses) the operation face F of the vibratable part V1 from the Z-direction side so as to apply a load in the Z' direction to the vibratable plate 100 of the vibratable part V1, the at least one vibration generator 200 vibrates the vibratable plate 100 in the Z-Z' direction in order to impart a tactile feel to the detection object, and the vibration causes changes (rises and falls) in the level of the output signal from the at least one load sensor 800 (changes in the load to be sensed by the at least one load sensor 800).

This is particularly true for the case where the vibratable part V1 is configured to receive a load in the Z' direction (i.e., configured to be touched (pressed) by a detection object from the Z-direction side), the at least one load sensor 800 is arranged on the Z'-direction side with respect to the vibratable plate 100, and the at least one vibration generator 200 is arranged on the Z'-direction side with respect to the vibratable plate 100. In this case, when the vibratable plate 100 of the vibratable part V1 is pressed from the Z-direction side by a detection object (i.e., subjected to a load in the Z' direction), the vibratable plate 100 is repeatedly pressed from the Z'-direction side by the at least one vibration generator 200 (i.e. intermittently pressed such as to be separated from the at least one load sensor 800). As a result, the output signal(s) from the at least one load sensor 800 changes (rises and falls) significantly. More specifically, the following states C1 and C2 are alternately repeated. The state C1 is such that the operation face F of the vibratable part V1 is pressed in the Z' direction by a detection object, whereas the vibratable plate 100 of the vibratable part V1 is pressed in the Z direction by the at least one vibration generator 200, resulting in that the output signal from the at least one load sensor 800 falls (the at least one load sensor 800 senses a decreased load). On the other hand, the state C2 is such that the operation face F of the vibratable part V1 is pressed in the Z' direction by the detection object, whereas the vibratable plate 100 is not pressed by the at least one vibration generator 200, resulting in that the output signal from the at least one load sensor 800 rises (the at least one load sensor 800 senses an increased load).

The vibration application mechanism T1 further includes a controller 900. The controller 900 is constituted by a logic circuit, such as an IC, or alternatively by software to be processed by a processor, for example. The controller 900 includes a touch controller 910 and a vibration controller 920. The controller 900 is electrically connected to the touch sensor 300, the at least one vibration generator 200, and the at least one load sensor 800. It should be appreciated that the touch controller 910 and the vibration controller 920 of the controller 900 may each be constituted by a logic circuit, such as an IC, or alternatively by software to be processed by a processor, for example.

A touch detection program is recorded in a memory internal and external to the controller 900. The touch controller 910 of the controller 900 processes the touch detection program to detect the coordinates of a touched position on the operation face F as described below.

Where the touch sensor 300 has configuration (a) described above, the touch controller 910 sequentially receives and amplifies output signals from the electrodes 310 of the touch sensor 300, and determines whether or not the signals amplified (hereinafter referred to as amplified signals) exceeds a threshold value stored in the memory of the controller 900. It should be noted that a signal exceeding a threshold value may be referred to as an "overthreshold signal." If the touch controller 910 determines that any of the amplified signals exceeds the threshold value (i.e. the amplified signals include an overthreshold signal), the touch controller 910 detects the coordinates of the position of the electrode 310 that has been approached by a detection object and outputted the overthreshold signal (i.e., the coordinates of the touched position on the operation face F which is located on the Z-direction side relative to such electrode 310). In this case, the touch controller 910 may detect the coordinates of the touched position on the operation face F by referring to more than one of the electrodes 310 through which overthreshold signals are outputted.

Where the touch sensor 300 has configuration (b) described above, the touch controller 910 sequentially supplies drive pulses to the drive electrodes, sequentially receives and amplifies output signals that are outputted through the detection electrodes in response to the supplied drive pulses, and determines whether or not the signals amplified (hereinafter referred to as amplified signals) exceed a threshold value stored in the memory of the controller 900. If the touch controller 910 determines that any of the amplified signals exceeds the threshold value (i.e. the amplified signals include an overthreshold signal), the touch controller 910 detects (judges) that a detection object has approached an area between the detection electrode through which the overthreshold signal is outputted and the corresponding drive electrode that has provided a drive pulse, or that a detection object has touched the intersection of such detection and drive electrodes (i.e. the touch controller 910 detects the coordinates of the touched position on the operation face F that is on the Z-direction side relative to the area between such detection and drive electrodes or relative to the intersection of such detection and drive electrodes).

Figure 3:
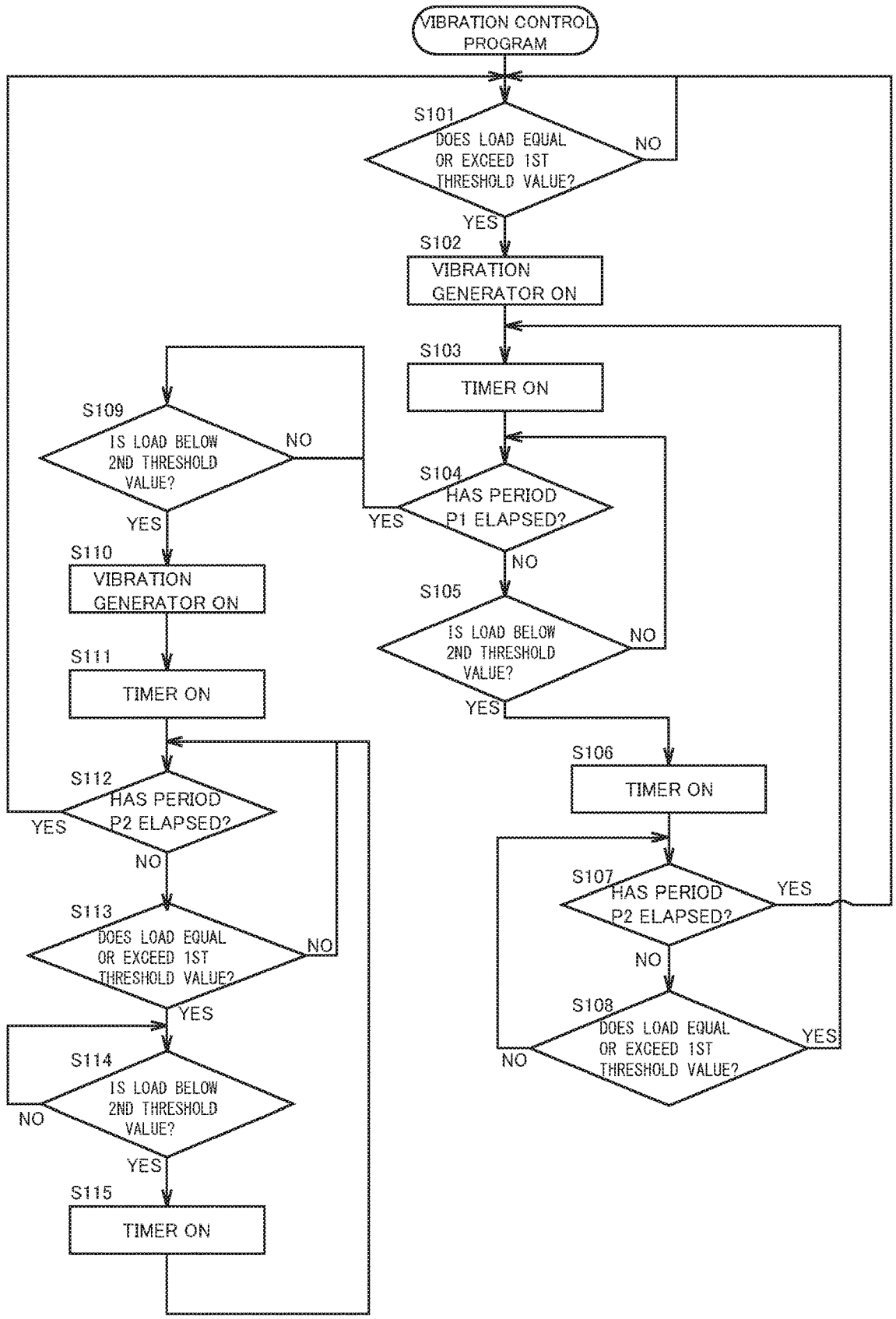
FIG. 3 is a flowchart of a vibration control program to be processed by a vibration controller of the vibration application mechanism of the first embodiment or its variant.
Figure 4:
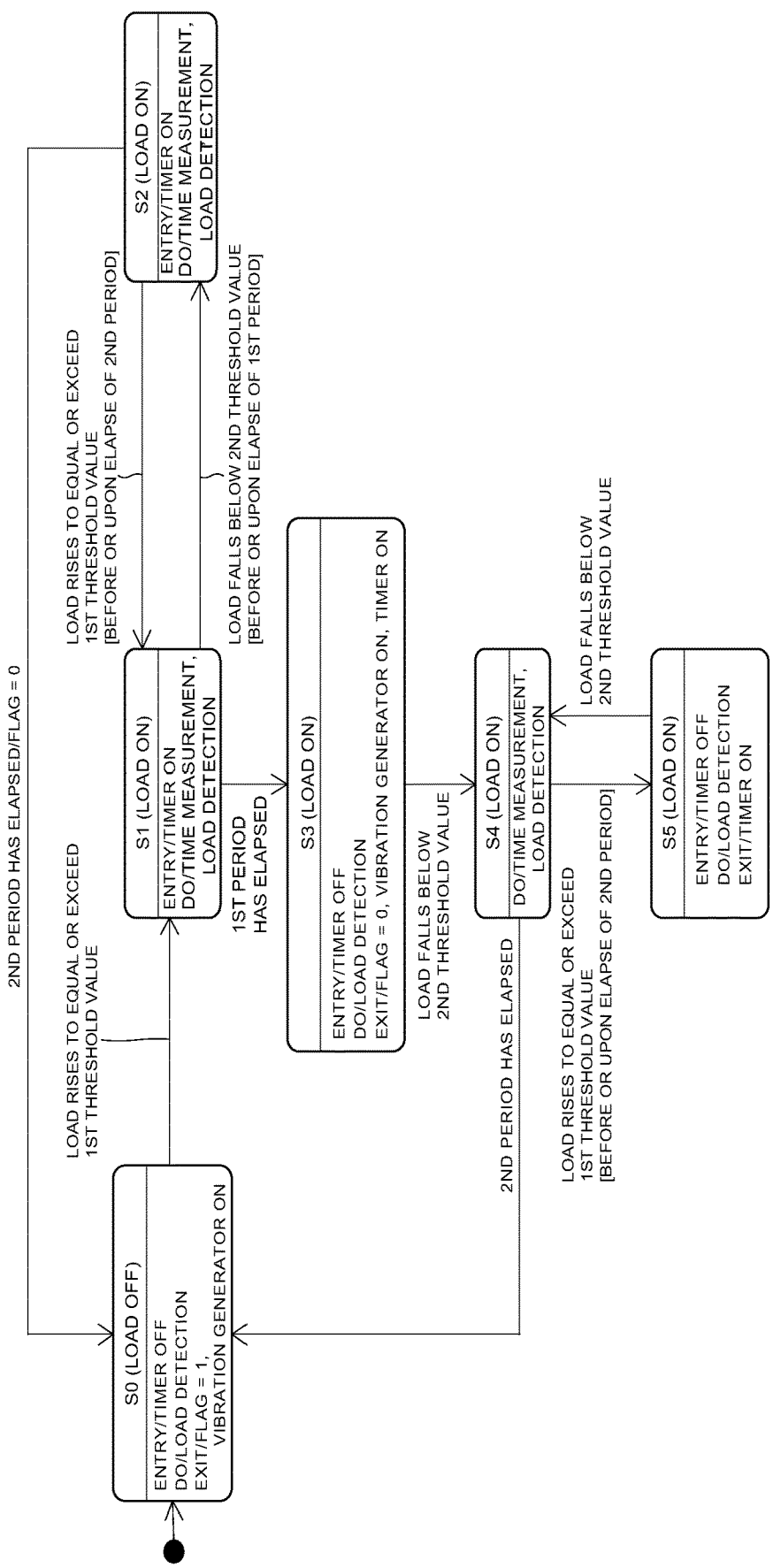
FIG. 4 is a state transition diagram showing operating states of the vibration application mechanism of the first embodiment or its variant.
Figure 6:
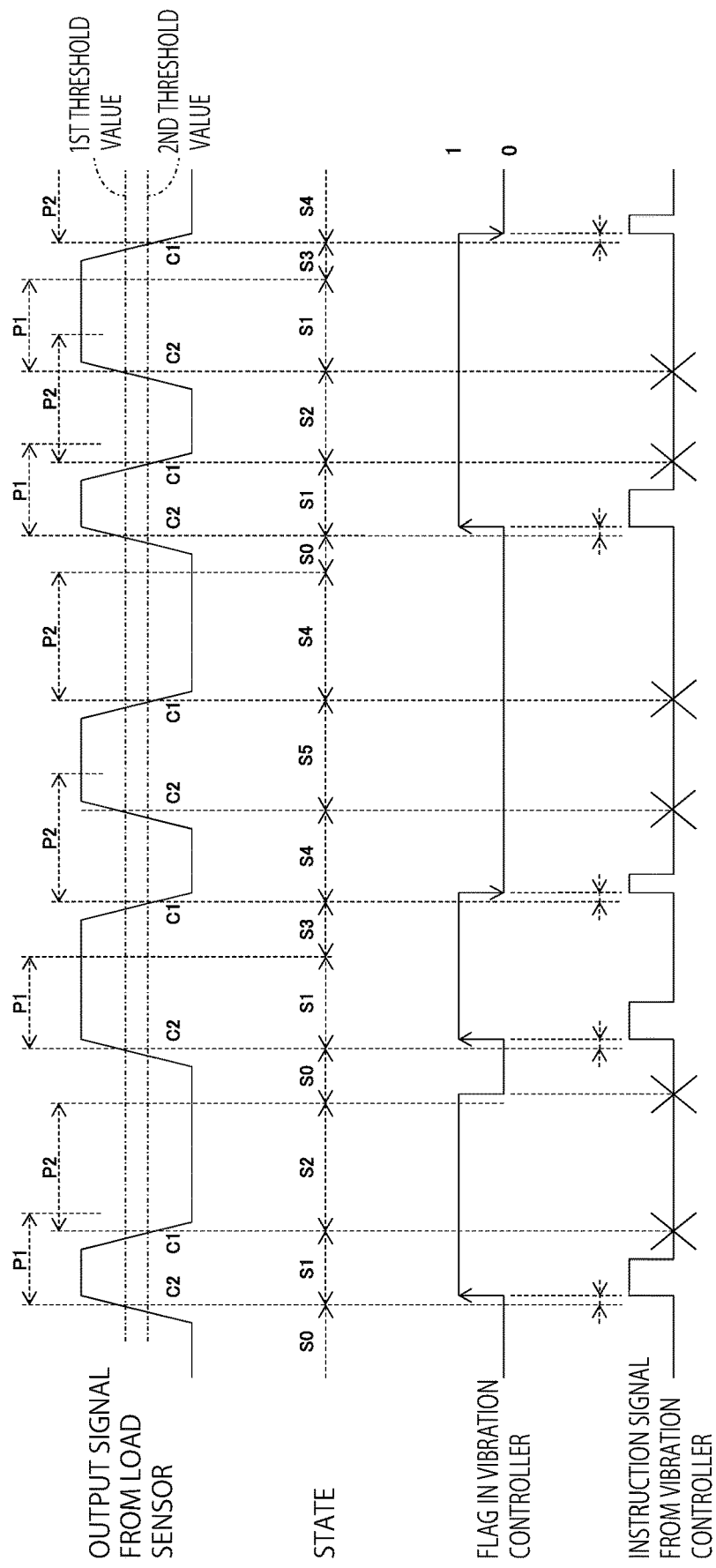
FIG. 6 is a timing chart related to the vibration application mechanism of the first embodiment or its variant.

The memory of the controller 900 also stores a vibration control program, a flowchart of which is shown in FIG. 3. The vibration controller 920 of the controller 900 is configured to process the vibration control program in order to control the at least one vibration generator 200. The following describes a flow of the vibration control program, i.e. a method of vibration control performed by the vibration controller 920, referring to the flowchart of the vibration control program shown in FIG. 3, also to a state transition diagram shown in FIG. 4, state transition tables shown in FIGS. 5A to 5B, and a timing chart shown in FIG. 6.

For convenience of description, states S0 to S5 are defined as follows. State S0 refers to an initial state of the vibration control program; state S1 refers to a state after the output signal from the at least one load sensor 800 has equaled or exceeded a first threshold value in step 101 (to be described); state S2 refers to a state after the output signal from the at least one load sensor 800 falls below a second threshold value during a period P2 (second period) that starts before a period P1 (first period) elapses; state S3 refers to a state after the elapse of the period P1; state S4 refers to a state after the output signal from the at least one load sensor 800 has fallen below the second threshold value after the elapse of the period P1; state S5 refers to a state after the output signal from the at least one load sensor 800 has equaled or exceeded the first threshold value during the period P2 (third period) that starts after the elapse of the period P1. In the state transition table of FIG. 5A, the header column shows the states (pre-states) S0 to S5, the header row shows the states (post-states) S0 to S5 immediately after the pre-states, and some of the cells at the intersection of pre-state rows and post-state columns show events occurring when pre-states shift to post-states. In the state transition table of FIG. 5B, the header column shows the pre-states S0 to S5, the header row shows events occurring immediately after the pre-states, and in the cells at the intersection of pre-state rows and event columns, the upper parts of the cells show EXIT processes (see also FIG. 4) executed in corresponding pre-states, and the lower parts of the cells show the post-states S0 to S5 following the corresponding pre-states.

When the vibration application mechanism T1 is powered on, the vibration controller 920 of the controller 900 executes the vibration control program. Then the vibration controller 920 continuously receives output signals from the at least one load sensor 800 and determines (makes a first determination) whether or not any output signal (for example, voltage) has equaled or exceeded the first threshold value stored on the memory (step S101). The vibration controller 920 thus makes the first determination in order to determine presence or absence of a touch by a detection object on the operation face F of the vibratable part V1. This is the state 0 defined above.

As a result of the determination in the step S101, if the vibration controller 920 has determined that any output signal from the at least one load sensor 800 has equaled or exceeded the first threshold value, i.e. has determined that the operation face F of the vibratable part V1 is touched by a detection object, then the vibration controller 920 sets a flag stored on the memory to value "1," and outputs an instruction signal (which has a first waveform) to the at least one vibration generator 200 to drive the at least one vibration generator 200 for a predetermined period (12 ms, for example) (step S102). As a result, the vibratable part V1 vibrates to impart a tactile feel (operation feeling), through the operation face F of the vibratable part V1, to the detection object with which the touch input operation (pressing) has been conducted. Such vibration of the vibratable part V1 will be referred to as "touch-time vibration of the vibratable part V1," and the tactile feel imparted to a detection object by means of touch-time vibration of the vibratable part V1 will be referred to as "touch-time tactile feel." It should be noted that vibration (intermittent pressing) of the vibratable part V1 may cause alternate repetition of the states C1 and C2 described above, but the touch-time vibration of the vibratable part V1 is not limited thereto.

If the vibration controller 920 determines, as a result of the determination in the step S101, that the output signal from the at least one load sensor 800 has equaled or exceeded the first threshold value, and if the vibration controller 920 therefore drives the at least one vibration generator 200, then the vibration controller 920 (1) turns on a timer circuit of the controller 900 or a software timer on the memory (either of such timers will be referred to simply as a timer) (step S103), (2) determines whether or not a predetermined period P1 (first period) has elapsed referring to the timer (step S104), and (3) determines (makes a second determination) whether or not the output signal from the at least one load sensor 800 has fallen below the second threshold value stored in the memory (step S105). In short, the vibration controller 920 makes the second determination during the period from when the output signal from the at least one load sensor 800 has equaled or exceeded the first threshold value (when the operation face F of the vibratable part V1 is touched) until the elapse of the period P1 (the first period).

The first threshold value may be any value, 1.65V for example. The second threshold value may any value below the first threshold value, and may be 1.60 v, for example. The period P1 may be any time period and may be a time period ranging from 10 ms through 200 ms, for example. In this embodiment, the term "during the period P1" means before or when the period P1 elapses, and "until the elapse of the period P1" and "after the elapse of the period P1" does not include the point in time when period P1 elapses.

It should be noted that a state shift from S0 to S1 occurs when the output signal from the at least one load sensor 800 has equaled or exceeded the first threshold value.

If the vibration controller 920 determines, as a result of the determination in the step S105, that the output signal from the at least one load sensor 800 has fallen below the second threshold value during the period P1, then the vibration controller 920 (1) does not drive the at least one vibration generator 200 but turns on a timer (step S106), (2) determines whether or not the period P2 (second period) has elapsed referring to the timer (step S107), and (3) determines (makes a third determination) whether or not the output signal from the at least one load sensor 800 has equaled or exceeded the first threshold value (step S108). In short, the vibration controller 920 makes the third determination during the period from when the output signal from the at least one load sensor 800 has fallen below the second threshold value until the elapse of the second period P2 (second period).

The process in the step S106 includes resetting the timer and restarting time measurement from zero seconds. The period P2 may be any time period and may be a time period ranging from 10 ms through 200 ms, for example. In this embodiment, the term "during the period P2" means before or when the period P2 elapses, and "until the elapse of the period P2" and "after the elapse of the period P2" does not include the point in time when period P2 elapses.

It should be noted that a state shift from S1 to S2 occurs when, during the period P, the output signal from the at least one load sensor 800 has fallen below the second threshold value.

If the vibration controller 920 determines, as a result of the determination in the step S108, that the output signal from the at least one load sensor 800 has equaled or exceeded the first threshold value, then the vibration controller 920 does not drive the at least one vibration generator 200 but returns its process to the step S103. Upon the return to the process in the step S103, the timer is reset to restart time measurement from 0 seconds.

On the other hand, if the period P2 (second period) has elapsed during which the vibration controller 920 does not determine that the output signal from the at least one load sensor 800 has equaled or exceeded the first threshold value (step S107), then the vibration controller 920 sets the flag on the memory to value "0" and turns off the timer, and returns its process to the step S101.

It should be noted that a state shift from S2 to S1 occurs when, during the period P2 (second period), the output signal from the at least one load sensor 800 has equaled or exceeded the first threshold value. It should also be noted that a state shift from S2 to S0 occurs upon the elapse of the period P2 (second period), provided that the output signal from the at least one load sensor 800 does not equal or exceed the first threshold value during the period P2.

If the period P1 has elapsed during which the vibration controller 920 does not determine, as a result of the determination in the step S105, that the output signal from the at least one load sensor 800 has fallen below the second threshold value (step S104), then the vibration controller 920 determines whether or not the output signal from the at least one load sensor 800 has fallen below the second threshold value (step S109) and thereby determines whether or not the detection object has left the operation face F of the vibratable part V1. If the vibration controller 920 determines, as a result of the determination in the step S109, that the output signal from the at least one load sensor 800 has fallen below the second threshold value, then the vibration controller 920 sets the flag on the memory to value "0" and outputs an instruction signal (which has a second waveform) to the at least one vibration generator 200 so as to drive the at least one vibration generator 200 for a predetermined period (10 ms, for example) (step S110). As a result, the vibratable part V1 vibrates to impart a tactile feel, through the operation face F of the vibratable part V1, to the detection object leaving the operation face F. Such vibration of the vibratable part V1 will be referred to as "leaving-time vibration of the vibratable part V1," and the tactile feel imparted to a detection object by means of leaving-time vibration of the vibratable part V1 will be referred to as "leaving-time tactile feel." Together with the impartation of such tactile feel at the leaving time, the vibration controller 920 also turns on the timer (step S111). Such vibration (intermittent pressing) of the vibratable part V1 may cause alternate repetition of the states C1 and C2 described above, but the leaving-time vibration of the vibratable part V1 is not limited to this.

With regard to the above instruction signals from the vibration controller 920, the second waveform of may preferably be, but is not required to be, narrower in width than the first waveform.

It should be noted that a state shift from S1 to S3 occurs upon the elapse of the period P1, provided that the output signal from the at least one load sensor 800 does not fall below the second threshold value during the period P1.

If the vibration controller 920 determines, as a result of the determination in the step S109, that the output signal from the at least one load sensor 800 has fallen below the second threshold value, then the vibration controller 920 drives the at least one vibration generator 200 and turns on the timer, and then the vibration controller 920 determines whether or not the period P2 (third period) has elapsed referring to the timer (step S112), and determines (makes a fourth determination) whether or not the output signal from the at least one load sensor 800 has equaled or exceeded the first threshold value (step S113). The vibration controller 920 makes the fourth determination during the period from when the output signal from the at least one load sensor 800 has fallen below the second threshold value until the elapse of the second period P2 (third period).

It should be noted that a state shift from S3 to S4 occurs when, after the period P1 has elapsed and the at least one vibration generator 200 is driven, the output signal from the at least one load sensor 800 has fallen below the second threshold value.

If the period P2 (third period) has elapsed during which the vibration controller 920 does not determine, as a result of the determination in the step S113, that the output signal from the at least one load sensor 800 has equaled or exceeded the first threshold value (step S112), then the vibration controller 920 turns off the timer and returns its process to the step S101.

On the other hand, if the vibration controller 920 determines, as a result of the determination in the step S113, that the output signal from the at least one load sensor 800 has equaled or exceeded the first threshold value, then the vibration controller 920 turns off the timer and determines (makes a fifth determination) whether or not the output signal from the at least one load sensor 800 has fallen below the second threshold value (step S114). If the vibration controller 920 determines, as a result of the fifth determination, that the output signal from the at least one load sensor 800 has fallen below the second threshold value, then the vibration controller 920 turns on the timer (step S115) and returns to its process to the step S112.

It should be noted that a state shift from S4 to S0 occurs upon the elapse of the period P2 (third period), provided that the output signal from the at least one load sensor 800 does not equal or exceed the first threshold value during the period P2 (third period). It should also be noted that a state shift from S4 to S5 occurs when, during the period P2 (third period), the output signal from the at least one load sensor 800 has equaled or exceeded the first threshold value.

As described above, the predetermined period for driving the at least one vibration generator 200 may preferably be, but is not required to be, shorter than the period P1 and also than the period P2. The invention may be such that the first, second, and third periods may all be the same, or that two of these periods are the same with the remaining one differing from the two periods, or that first, second, and third periods differ from each other.

The vibration application mechanism T1 described above may operate as described below, which will be referred to as non-limiting first to fifth operation examples.

First Operation Example (State S0→S1→S3→S4→S0)

In the initial state S0, when a detection object touches the operation face F of the vibratable part V1 and applies a load to the vibratable part V1, the output signal from the at least one load sensor 800 (load applied to the vibratable part V1) changes to equal or exceed the first threshold value. In response to this, the vibration controller 920 drives the at least one vibration generator 200 to vibrate the vibratable part V1. The touch-time vibration of the vibratable part V1 thus occurs so as to impart a touch-time tactile feel to the detection object. The touch by the detection object continues at least until the elapse of the period P1 (state S1→S3), and the detection object leaves the operation face F of the vibratable part V1 after the elapse of the period P1. In other words, due to the continued touch during the period P1, the output signal from the at least one load sensor 800 does not fall below the second threshold value, and due to the leaving of the detection object after the elapse of the period P1, the output signal from at least one load sensor 800 falls below the second threshold value (state S3→S4). Then, the vibration controller 920 drives the at least one vibration generator 200 to vibrate the vibratable part V1. The leaving-time vibration of the vibratable part V1 thus occurs so as to impart a leaving-time tactile feel to the detection object. The output signal from the at least one load sensor 800 changes due to the leaving-time vibration of the vibratable part V1, but the output signal does not equal or exceed the first threshold value until the elapse of the period P2 that starts after the leaving-time vibration of the vibratable part V1 (state S4→S0).

In the first operation example, the vibration application mechanism T1 operates such as to prevent an erroneous actuation of the at least one vibration generator 200 which would otherwise be caused by the touch-time vibration and caused by the leaving-time vibration of the vibratable part V1.

More particularly, the touch by a detection object on the operation face F of the vibratable part V1 continues at least until the elapse of the period P1 (steps S103 to S105), so that the output signal from the at least one load sensor 800 does not fall below the second threshold value during the period P1. Therefore, the touch-time vibration of the vibratable part V1 will not cause the vibration controller 920 to drive the at least one vibration generator 200.

Also, the output signal from the at least one load sensor 800 changes due to the leaving-time vibration of the vibratable part V1 as described above (step S110), but the output signal does not equal or exceed the first threshold value until the elapse of the period P2 (steps S111 to S113). Therefore, the leaving-time vibration of the vibratable part V1 will not cause the vibration controller 920 to drive the at least one vibration generator 200.

Second Operation Example (State S0→S1→S3→S4→S5→S4→S0 or state S0→S1→S3→S4→S5→S4→S5→S4→S0)

As in the first operation example, in the initial state S0, when a detection object touches the operation face F of the vibratable part V1, the touch-time vibration of the vibratable part V1 occurs so as to impart a touch-time tactile feel to the detection object. Then, as in the first operation example, the touch by the detection object continues at least until the elapse of the period P1 (state S1→S3), and the detection object leaves the operation face F of the vibratable part V1 after the elapse of the period P1. In other words, when the output signal from at least one load sensor 800 falls below the second threshold value due to the leaving of the detection object after the elapse of the period P1 (state S3→S4), then the leaving-time vibration of the vibratable part V1 occurs so as to impart a leaving-time tactile feel to the detection object. The output signal from the at least one load sensor 800 changes due to the leaving-time vibration of the vibratable part V1, so that the output signal rises to equal or exceed the first threshold value during the period P2 and then falls below the second threshold value, or such rise and fall of the output signal are repeated (state S4→state S5). Thereafter, the leaving-time vibration of the vibratable part V1 diminishes over time, resulting in that the output signal from the at least one load sensor 800 changes from the first threshold value or larger to a value below the second threshold value. The period P2 elapses during which the output signal remains below the second threshold value (state S5→S4→S0).

In the second operation example, as in the first operation example, the vibration application mechanism T1 operates such as to prevent an erroneous actuation of the at least one vibration generator 200 which would otherwise be caused by the touch-time vibration of the vibratable part V1.

The vibration application mechanism T1 also operates such as to prevent an erroneous actuation of the at least one vibration generator 200 which would otherwise be caused by the leaving-time vibration of the vibratable part V1 in the follow manner. The output signal from the at least one load sensor 800 rises to equal or exceed the first threshold value due to the leaving-time vibration of the vibratable part V1 during the period P2, and then falls below the second threshold value, or such rise and fall of the output signal are repeated (steps S111 to S114). Such rise and fall, or repetition of the rise and fall, of the output signal will not cause the vibration controller 920 to drive the at least one vibration generator 200, regardless of whether the output signal has equaled or exceeded the first threshold value or has fallen below the second threshold value.

Third Operation Example (State S0→S1→S2→S0 or S0→S1→S2→S1→S2→S0)

As in the first operation example, in the initial state S0, when a detection object touches the operation face F of the vibratable part V1, the touch-time vibration of the vibratable part V1 occurs so as to impart a touch-time tactile feel to the detection object. Thereafter, the detection object leaves the operation face F of the vibratable part V1 during the period P1 (state S1→S2). The output signal from the at least one load sensor 800 falls below the second threshold value during the period P1 due to the touch-time vibration of the vibratable part V1 and/or the leaving of the detection object during the period P1, and then during the period P2, the output signal does not equal or exceed the first threshold value (state S2→state S0). Alternatively, the output signal from the at least one load sensor 800 falls below the second threshold value during the period P1 due to the touch-time vibration of the vibratable part V1 and/or the leaving of the detection object during the period P1, and then during the period P2, the output signal rises to equal or exceed the first threshold value, or such fall and rise of the output signal are repeated (state S1→state S2). Thereafter, the touch-time vibration of the vibratable part V1 diminishes over time, resulting in that the output signal from the at least one load sensor 800 changes from the first threshold value or larger to a value below the second threshold value. The period P2 elapses during which the output signal remains below the second threshold value (state S2→S1→S2→S0).

In the third operation example, the vibration application mechanism T1 operates such as to prevent an erroneous actuation of the at least one vibration generator 200 which would otherwise be caused by the touch-time vibration of the vibratable part V1 and also to prevent occurrence of the leaving-time vibration of the vibratable part V1.

More particularly, the output signal from the at least one load sensor 800 falls below the second threshold value due to the touch-time vibration of the vibratable part V1 and/or the leaving of the detection object during the period P1, and the second period elapses during which the output signal remains below the second threshold value (states S103 to S108). Alternatively, the output signal from the at least one load sensor 800 falls below the second threshold value due to the touch-time vibration of the vibratable part V1 and/or the leaving of the detection object during the period P1, and then the output signal rises to equal or exceed the first threshold value, or such fall and rise of the output signal are repeated (steps S103 to S108). Such fall and rise, or repetition of the fall and rise, of the output signal will not cause the vibration controller 920 to drive the at least one vibration generator 200, regardless of whether the output signal has fallen below the second threshold value or has equaled or exceeded the first threshold value.

Fourth Operation Example (State S0→S1→S2→S1→S3→S4→S0)

As in the first operation example, in the initial state S0, when a detection object touches the operation face F of the vibratable part V1, the touch-time vibration of the vibratable part V1 occurs so as to impart a touch-time tactile feel to the detection object. The touch by the detection object continues until the elapse of the period P1, but due to the touch-time vibration of the vibratable part V1, the output signal from the at least one load sensor 800 falls below the second threshold value during the period P1 (state S1→state S2). However, due to the continued touch, the output signal from the at least one load sensor 800 returns to the first threshold value or larger during the period P1 (state S2→S1). Then, after the elapse of the period P1 (state S1 to S3), the detection object leaves the operation face F of the vibratable part V1. Due to this leaving of the detection object after the elapse of the period P1, the output signal from the at least one load sensor 800 falls below the second threshold value (state S3 to S4). Then, the vibration controller 920 drives the at least one vibration generator 200 to vibrate the vibratable part V1. The leaving-time vibration of the vibratable part V1 thus occurs so as to impart a leaving-time tactile feel to the detection object. The output signal from the at least one load sensor 800 changes due to the leaving-time vibration of the vibratable part V1, but the output signal does not equal or exceed the first threshold value until the elapse the period P2 that starts after the leaving-time vibration of the vibratable part V1 (state S4→S0).

In the fourth operation example, the vibration application mechanism T1 operates such as to prevent an erroneous actuation of the at least one vibration generator 200 which would otherwise be caused by the touch-time vibration of the vibratable part V1 and caused by the leaving-time vibration of the vibratable part V1.

More particularly, due to the touch by the detection object and the touch-time vibration of the vibratable part V1 during the period P1, the output signal from the at least one load sensor 800 falls below the second threshold value and then rises to equal or exceed the first threshold value (steps S103 to S108). Alternatively, such fall and rise of the output signal are repeated. Such fall and rise, or repetition of the fall and rise, of the output signal will not cause the vibration controller 920 to drive the at least one vibration generator 200, regardless of whether the output signal has fallen below the second threshold value or has equaled or exceeded the first threshold value.

Further, the output signal from the at least one load sensor 800 changes due to the leaving-time vibration of the vibratable part V1 as described above, but the output signal does not equal or exceed the first threshold value until the elapse of the period P2 (steps S111 to S113). Therefore, the leaving-time vibration of the vibratable part V1 will not cause the vibration controller 920 to drive the at least one vibration generator 200.

Fifth Operation Example (State
S0→S1→S2→S1→S3→S4→S5→S4→S0 or
S0→S1→S2→S1→S3→S4→S5→S4→S5→S4→S0)

As in the fourth operation example, in the initial state S0, when a detection object touches the operation face F of the vibratable part V1, the touch-time vibration of the vibratable part V1 occurs so as to impart a touch-time tactile feel to the detection object. Also, as in the fourth operation example, the touch by the detection object continues until the elapse of the period P1, but due to the touch-time vibration of the vibratable part V1, the output signal from the at least one load sensor 800 falls below the second threshold value during the period P1 (state S1→S2). However, due to the continued touch, the output signal from the at least one load sensor 800 returns to the first threshold value or larger during the period P1 (state S2→S1). Then, as in the fourth operation example, after the elapse of the period P1 (state S1 to S3), the detection object leaves the operation face F of the vibratable part V1, resulting in that the leaving-time vibration of the vibratable part V1 occurs so as to impart a leaving-time tactile feel to the detection object. The output signal from the at least one load sensor 800 changes due to the leaving-time vibration of the vibratable part V1, so that the output signal rises to equal or exceed the first threshold value during the period P2 and then falls below the second threshold value, or such rise and fall of the output signal are repeated (state S4→state S5). Thereafter, the leaving-time vibration of the vibratable part V1 diminishes over time, resulting in that the output signal from the at least one load sensor 800 changes from the first threshold value or larger to a value below the second threshold value. The period P2 elapses during which the output signal remains below the second threshold value (state S5→S4→S0).

In the fifth operation example, as in the fourth operation example, the vibration application mechanism T1 operates such as to prevent an erroneous actuation of the at least one vibration generator 200 which would otherwise be caused by the touch-time vibration of the vibratable part V1. Further, as in the second operation example, the vibration application mechanism T1 also operates such as to prevent an erroneous actuation of the at least one vibration generator 200 which would otherwise be caused by the leaving-time vibration of the vibratable part V1.

The vibration application mechanism T1 described above is configured to prevent an erroneous actuation of the at least one vibration generator 200 which would otherwise be caused by the touch-time vibration of the vibratable part V1 in various manners described above. In a case where a detection object continues to touch the vibratable part V1 until the elapse of the period P1, the vibration application mechanism T1 imparts a tactile feel to the detection object in response to the leaving of the detection object from the vibratable part V1, but prevents an erroneous actuation of the at least one vibration generator 200, in various manners described above, which would otherwise be caused by the leaving-time vibration of the vibratable part V1. On the other hand, in a case where a detection object touches the vibratable part V1 and then leaves during the period P1, as described above, the leaving-time vibration of the vibratable part V1 does not occur. In this case, since the detection object touches and leaves the vibratable part V1 during a short period of time, i.e. period P1, the touch-time vibration of the vibratable part V1 will suffice to impart a tactile feel to the detection object without the need to apply the leaving-time vibration of the vibratable part V1 to the detection object.

Moreover, if a detection object touches the operation face F of the vibratable part V1 and the output signal from the at least one load sensor 800 (load applied to the vibratable part V1) changes to equal or exceed the first threshold value, then the vibration controller 920 performs a process of driving the at least one vibration generator 200 to vibrate the vibratable part V1 and then preventing an erroneous actuation of the at least one vibration generator 200 which would otherwise be caused by the touch-time vibration of the vibratable part V1. This process allows the vibration application mechanism T1 to impart a tactile feel to a detection object at the touch-time without a time lag.

Second Embodiment

Figure 7:
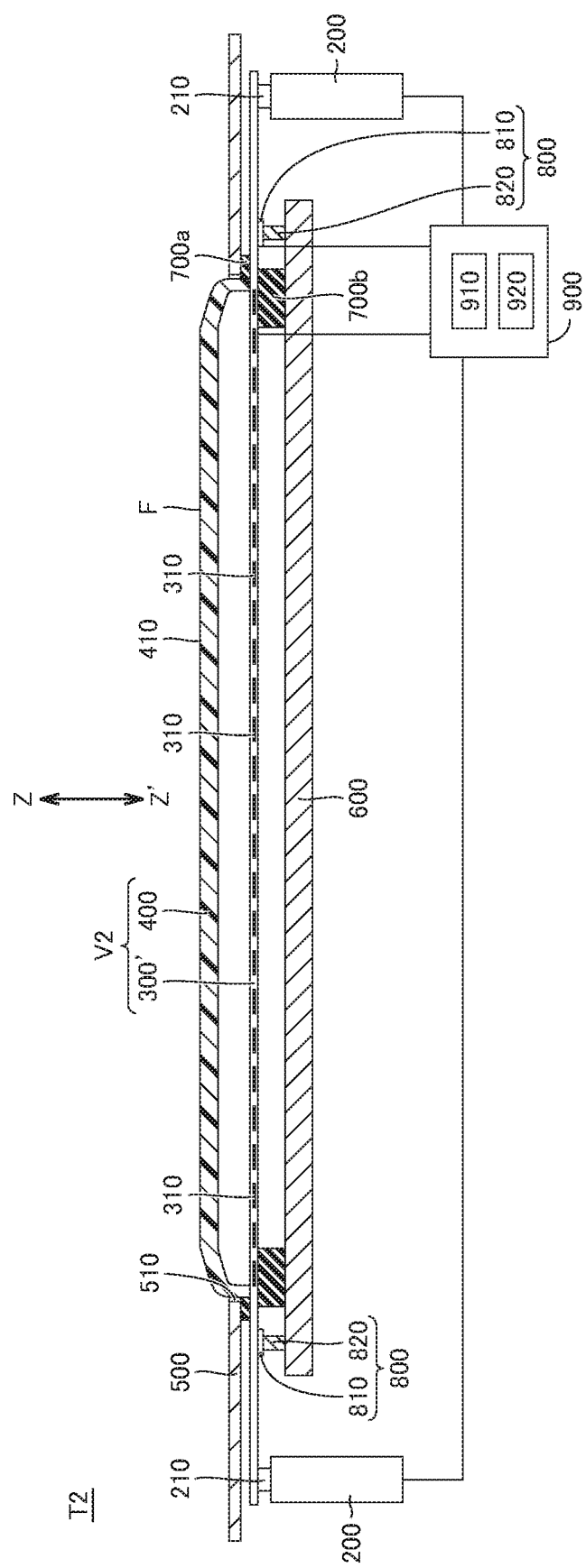
FIG. 7 is a schematic cross-sectional view of a vibration application mechanism according to a second embodiment of the invention.

The following discussion is directed to a vibration application mechanism T2 according to various embodiments of the invention, including a second embodiment, with reference to FIG. 7. The vibration application mechanism T2 has a similar configuration as that the vibration application mechanism T1, except the following differences: (1) the vibratable part V2 includes a capacitive touch sensor 300' and the operation panel 400 (that is, the vibratable plate 100 is omitted); (2) the cushioning members 700a and 700b hold the touch sensor 300', rather than the vibratable plate 100, in the Z-Z' direction; and (3) the at least one vibration generator 200 apply vibration to the touch sensor 300' of the vibratable part V2. These differences will be described in detail while overlapping descriptions with the mechanism T1 will be omitted.

The touch sensor 300' has the same configuration as the touch sensor 300 of the vibration application mechanism T1, except that the touch sensor 300' is held in the Z-Z' direction by and between the cushioning members 700a and 700b. The cushioning member 700a may be omitted, in which case the touch sensor 300' may be fixed to the housing 500, directly or indirectly via an intermediary member. The cushioning member 700b may be omitted together with the fixing plate 600.

The operation panel 400 is fixed, not on the vibratable plate 100, but on the face on the Z-direction side of the touch sensor 300' with a double-sided adhesive or the like. Otherwise the operation panel 400 may have the same configuration as that of the vibration application mechanism T1. The operation panel 400 vibrates in the Z-Z' direction together with the touch sensor 300'. When the operation face F of the operation panel 400 is pressed with a certain load in the Z' direction, the load is applied to the touch sensor 300' through the operation panel 400. The operation panel 400 may be omitted, in which case the face on the Z-direction side of the touch sensor 300' may preferably serve as the operation face F.

The at least one vibration generator 200 is configured to vibrate the touch sensor 300' of the vibratable part V2, not the vibratable plate 100, in the Z-Z' direction. Otherwise the at least one vibration generator 200 may have the same configuration as that of the vibration application mechanism T1.

The at least one load sensor 800 is configured to sense a load in the Z' direction applied onto the touch sensor 300' of the vibratable part V2 and to output a signal (hereinafter referred to as an "output signal") or change the output signal in level (e.g. change the voltage of the signal) in accordance with the sensed load. More specifically, the at least one load sensor 800 may raise the output signal in accordance with the increase of the sensed load and lower the output signal in accordance with the decrease of the sensed load. Otherwise the at least one load sensor 800 may have the same configuration as that of the vibration application mechanism T1.

The vibration application mechanism T2 is configured such that a load applied to the touch sensor 300' of the vibratable part V2 is sensed by the at least one load sensor 800, and that the touch sensor 300' is vibrated by the at least one vibration generator 200. As such, when a detection object touches (presses) the operation face F of the vibratable part V2 from the Z-direction side so as to apply a load in the Z' direction to the touch sensor 300' of the vibratable part V2, the at least one vibration generator 200 vibrates the touch sensor 300' in the Z-Z' direction in order to impart a tactile feel to the detection object. This vibration, as in the vibration application mechanism T1, will result in changes (rises and falls) of the level of the output signal from the at least one load sensor 800 (the load sensed by the at least one load sensor 800).

This is particularly true for the case where the vibratable part V2 of the vibration application mechanism T2 is configured to receive a load in the Z' direction (i.e., configured to be touched (pressed) by a detection object from the Z-direction side), the at least one load sensor 800 is arranged on the Z'-direction side with respect to the touch sensor 300', and the at least one vibration generator 200 is arranged on the Z'-direction side with respect to the touch sensor 300'. In this case, the output signal(s) from the at least one load sensor 800 changes (rises and falls) significantly, i.e. the states C1 and C2 described above are alternately repeated, as in the case of the vibration application mechanism T1.

The vibration application mechanism T2 is further configured, as in the vibration application mechanism T1, such that the vibration controller 920 processes a vibration control program as shown in FIG. 3 in order to control the drive of the at least one vibration generator 200. Accordingly, the vibration application mechanism T2 provides similar technical features and effects as those of the vibration application mechanism T1.

It should be appreciated that the vibration application mechanism of the invention is not limited to the particular embodiments described above but may be modified in any manner within the scope of claims. Some example modifications will be described below.

The touch sensor of the vibratable part of any aspect of the invention may have any configuration to detect whether or not a detection object touches the operation face of the vibratable part or to detect coordinates of a touched position on the operation face. Some examples of the touch sensor of any aspect of the invention are touch sensors of resistive, optical, electromagnetic inductive, or ultrasonic type.

The touch controller of any aspect of the invention may be configured to only detect a touch on the operation face, rather than detecting the coordinate position(s) of the touch on the operation face, on the basis of a change in an output signal from the touch sensor.

The at least one vibration generator of any aspect of the invention may have any configuration to apply vibration to the vibratable part. For example, the at least one vibration generator of any aspect of the invention may be configured to apply vibration to the vibratable part from a direction other than the Z-Z' direction.

The at least one load sensor of any aspect of the invention may have any configuration to sense a load applied to the vibratable part. For example, the at least one load sensor may be configured to change an output signal therefrom in accordance with a load applied to the vibratable part.

The vibratable part of any aspect of the invention may have any configuration that allows the at least one vibration generator to vibrate the vibratable part and allows the at least one load sensor to sense a load applied to the vibratable part.

The vibration controller of any aspect of the invention may be modified to perform the process in the steps S101 to S105 only, with the steps S106 to S115 omitted. In this case, if the vibration controller determines that the answer in the step S104 is "YES," then the vibration controller transfers its process to the step S105; if the vibration controller determines that the answer in the step S105 is "NO," then the vibration controller transfers its process to the step S104; and if the vibration controller determines that the answer to the determination in the step S105 is "YES," then the vibration controller returns its process to the step S101. Such modified vibration controller will not erroneously drive the at least one vibration generator during the period P1 even if touch-time vibration of the vibratable part V1 or V2 causes an output signal from the at least one load sensor to fall below the second threshold value during the period P1.

The vibration controller of any aspect of the invention may also be modified to perform the process in the steps S101 to S108 only, with the steps S109 to S115 omitted. In this case, if the vibration controller determines that the answer in the step S105 is "YES," then the vibration controller returns its process to the step S101. Such modified vibration controller will not erroneously drive the at least one vibration generator during either the period P1 or the period P2 even if touch-time vibration of the vibratable part V1 or V2 causes an output signal from the at least one load sensor to fall below the second threshold value and then rise to equal or exceed the first threshold value, or causes repetition of such fall and rise of the output signal.

The vibration controller of any aspect of the invention may also be modified to perform the process in the steps S101 to S105 and S109 to S113, with the steps S106 to S108, S114, and S115 omitted. In this case, if the vibration controller determines that the answer in the step S104 is "YES," then the vibration controller transfers its process to the step S105; if the vibration controller determines that the answer in the step S105 is "NO," then the vibration controller transfers its process to the step S104; if the vibration controller determines that the answer in the step S105 is "YES," then the vibration controller returns its process to the step S101; and if the vibration controller determines that the answer in the step S112 is "YES," then the vibration controller transfers its process to the step S113. Such modified vibration controller will not erroneously drive the at least one vibration generator during the period P1 even if touch-time vibration of the vibratable part V1 or V2 causes an output signal from the at least one load sensor to fall below the second threshold value during the period P1. Further, the modified vibration controller will not erroneously drive the at least one vibration generator during the period P2 even if leaving-time vibration of the vibratable part V1 or V2 causes an output signal from the at least one load sensor to rise to equal or exceed the first threshold value.

The vibration controller of any aspect of the invention may also be modified to perform the process in the steps S101 to S113, with the steps S114 and S115 omitted. In this case, if the vibration controller determines that the answer in the step S112 is "YES," then the vibration controller transfers its process to the step S113. Such modified vibration controller will not erroneously drive the at least one vibration generator during either the period P1 or the period P2 even if touch-time vibration of the vibratable part V1 or V2 causes an output signal from the at least one load sensor to fall below the second threshold value and then rise to equal or exceed the first threshold value, or causes repetition of such fall and rise of the output signal. Further, the modified vibration controller will not erroneously drive the at least one vibration generator during the period P2 (the third period) even if leaving-time vibration of the vibratable part V1 or V2 causes an output signal from the at least one load sensor to rise to equal or exceed the first threshold value.

The vibration controller of any aspect of the invention may also be modified to perform the process in the steps S101 to S105 and S109 to S115, with the steps S106 to S108 omitted. In this case, if the vibration controller determines that the answer in the step S104 is "YES," then the vibration controller transfers its process to the step S105; and if the vibration controller determines that the answer in the step S105 is "NO," then the vibration controller transfers its process to the step S104. Such modified vibration controller will not erroneously drive the at least one vibration generator during the period P1 even if touch-time vibration of the vibratable part V1 or V2 causes an output signal from the at least one load sensor to fall below the second threshold value during the period P1. Further, the modified vibration controller will not erroneously drive the at least one vibration generator during the period P2 (the third period) even if leaving-time vibration of the vibratable part V1 or V2 causes an output signal from the at least one load sensor to rise to equal or exceed the first threshold value and then fall below the second threshold value, or causes repetition of such rise and fall of the output signal.

The fixing plate of any aspect of the invention can be replaced by the housing or other member of the vibration application mechanism.

It should be appreciated that the materials, the shapes, the dimensions, the number, the positions, etc. of the elements of the vibration application mechanism in the above-described embodiments and their variants are presented by way of example only and can be modified in any manner as long as the same functions can be fulfilled. The aspects and variants of the above-described embodiments can be combined in any possible manner. It should also be noted that the first and second threshold values of any aspect of the invention may be the same value or different values. For example, the second threshold value of any aspect of the invention may also be a value greater than the first threshold value.

INDUSTRIAL APPLICABILITY

The invention is applicable to any electronic device that imparts a tactile feel to a detection object or other object through the operation face of the vibration application mechanism of any aspect of the invention, or through an operation face of a device to be used with the vibration application mechanism of any aspect of the invention. For example, the vibration application mechanism T1 may be modified to exclude the touch sensor and to be applied to any such electronic device. The touch controller may be omitted together with the touch sensor.

present invention can include any combination of these various features or embodiments above and/or below as set-forth in sentences and/or paragraphs. Any combination of disclosed features herein is considered part of the present invention and no limitation is intended with respect to combinable features.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

REFERENCE SIGNS LIST

T1, T2: vibration application mechanism
100: vibratable plate
101: first face
102: second face
200: vibration generator
210: plunger
300, 300': touch sensor
310: electrode
400: control panel
410: panel body
420: leg
F: operation face
500: hosing
510: opening
600: fixing plate
700a, 700b: cushioning member
800: load sensor
810: pressure-sensing element
820: pin
900: controller
910: touch controller
920: vibration controller

What is claimed is:

1. A vibration application system comprising:
a vibratable part;
a load sensor to sense a load applied to the vibratable part;
a vibration generator to vibrate the vibratable part; and
a vibration controller configured such that
the vibration controller makes a first determination as to whether or not a load sensed by the load sensor has equaled or exceeded a first threshold value,
if the vibration controller determines, as a result of the first determination, that the load sensed by the load sensor has equaled or exceeded the first threshold value, then the vibration controller drives the vibration generator and makes a second determination, during a predetermined first period, as to whether or not a load sensed by the load sensor has fallen below a second threshold value, wherein the first period starts when the load sensed by the load sensor has equaled or exceeded the first threshold value, if the vibration controller determines, as a result of the second determination, that the load sensed by the load sensor has fallen below the second threshold value during the first period, then the vibration controller does not drive the vibration generator, if the vibration controller determines, as a result of the second determination, that the load sensed by the load sensor has fallen below the second threshold value during the first period, then the vibration controller makes a third determination, during a predetermined second period, as to whether or not a load sensed by the load sensor has equaled or exceeded the first threshold value, wherein the second period starts when the load sensed by the load sensor has fallen below the second threshold value, if the vibration controller determines, as a result of the third determination, that the load sensed by the load sensor has equaled or exceeded the first threshold value during the second period, then the vibration controller does not drive the vibration generator but returns to the second determination, and if the vibration controller determines, as a result of the third determination, that the load sensed by the load sensor does not equal or exceed the first threshold value during the second period, then after elapse of the second period, the vibration controller returns to the first determination.

2. The vibration application system according to claim 1, wherein the vibration controller is further configured such that, if the load sensed by the load sensor does not fall below the second threshold value during the first period but falls below the second threshold value after the first period has elapsed, then the vibration controller drives the vibration generator.

3. The vibration application system according to claim 2, wherein the vibration controller is further configured such that after the elapse of the first period, the vibration controller makes a fourth determination, during a predetermined third period, as to whether or not a load sensed by the load sensor has equaled or exceeded the first threshold value, wherein the third period starts when the load sensed by the load sensor has fallen below the second threshold value, if the vibration controller determines, as a result of the fourth determination, that the load sensed by the load sensor has equaled or exceeded the first threshold value during the third period, then the vibration controller does not drive the vibration generator, and if the vibration controller determines, as a result of the fourth determination, that the load sensed by the load sensor does not equal or exceed the first threshold value during the third period, then after elapse of the third period, the vibration controller returns to the first determination.

4. The vibration application system according to claim 3, wherein the vibration controller is further configured such that if the vibration controller determines, as a result of the fourth determination, that the load sensed by the load sensor has equaled or exceeded the first threshold value during the third period, then the vibration controller makes a fifth determination as to whether or not a load sensed by the load sensor has fallen below the second threshold value, and if the vibration controller determines, as a result of the fifth determination, that the load sensed by the load sensor has fallen below the second threshold value, then the vibration controller does not drive the vibration generator but returns to the fourth determination.

5. The vibration application system according to claim 1, wherein the vibration controller is further configured such that, if the load sensed by the load sensor does not fall below the second threshold value during the first period but falls below the second threshold value after the first period has elapsed, then the vibration controller drives the vibration generator.

6. The vibration application system according to claim 5, wherein the vibration controller is further configured such that after the elapse of the first period, the vibration controller makes a fourth determination, during a predetermined third period, as to whether or not a load sensed by the load sensor has equaled or exceeded the first threshold value, wherein the third period starts when the load sensed by the load sensor has fallen below the second threshold value, if the vibration controller determines, as a result of the fourth determination, that the load sensed by the load sensor has equaled or exceeded the first threshold value during the third period, then the vibration controller does not drive the vibration generator, and if the vibration controller determines, as a result of the fourth determination, that the load sensed by the load sensor does not equal or exceed the first threshold value during the third period, then after elapse of the third period, the vibration controller returns to the first determination.

7. The vibration application system according to claim 6, wherein the vibration controller is further configured such that if the vibration controller determines, as a result of the fourth determination, that the load sensed by the load sensor has equaled or exceeded the first threshold value during the third period, then the vibration controller makes a fifth determination as to whether or not a load sensed by the load sensor has fallen below the second threshold value, and if the vibration controller determines, as a result of the fifth determination, that the load sensed by the load sensor has fallen below the second threshold value, then the vibration controller does not drive the vibration generator but returns to the fourth determination.

8. The vibration application system according to claim 7, wherein the first period is between, or equal to, 10 ms and 200 ms, the second period is between, or equal to, 10 ms and 200 ms, and the third period is between, or equal to, 10 ms and 200 ms.

9. The vibration application mechanism system according to claim 6, wherein the first period is between, or equal to, 10 ms and 200 ms, the second period is between, or equal to, 10 ms and 200 ms, and the third period is between, or equal to, 10 ms and 200 ms.

10. The vibration application system according to claim 1, wherein the vibratable part is configured to be pressed from a first direction side, and the vibration generator is configured to apply vibration to the vibratable part from a second direction side, the second direction being opposite to the first direction.

11. The vibration application system according to claim 10, wherein the load sensor is arranged on the second direction side with respect to the vibratable part, and is configured to sense a load in the second direction applied to the vibratable part.

12. The vibration application system according to claim 1, wherein the first period is between, or equal to, 10 ms and 200 ms.

13. The vibration application system according to claim 1, wherein the vibratable part includes:

a vibratable plate; and a touch sensor directly or indirectly fixed to the vibratable plate, the vibration generator is configured to vibrate the vibratable plate, and the load sensor is configured to sense a load applied to the vibratable plate.

14. The vibration application system according to claim 1, wherein the vibratable part includes a touch sensor, the vibration generator is configured to vibrate the touch sensor, and the load sensor is configured to sense a load applied to the touch sensor.

15. A vibration control method in which a load applied to a vibratable part is sensed by a load sensor and a vibration generator is configured to vibrate the vibratable part, wherein a vibration controller makes a first determination as to whether or not a load sensed by the load sensor has equaled or exceeded a first threshold value, if the vibration controller determines, as a result of the first determination, that the load sensed by the load sensor has equaled or exceeded the first threshold value, then the vibration controller drives the vibration generator, the vibration controller makes a second determination, during a predetermined first period, as to whether or not a load sensed by the load sensor has fallen below a second threshold value, wherein the first period starts when the load sensed by the load sensor has equaled or exceeded the first threshold value, if the vibration controller determines, as a result of the second determination, that the load sensed by the load sensor has fallen below the second threshold value during the first period, then the vibration controller does not drive the vibration generator, if the vibration controller determines, as a result of the second determination, that the load sensed by the load sensor has fallen below the second threshold value during the first period, then the vibration controller makes a third determination, during a predetermined second period, as to whether or not a load sensed by the load sensor has equaled or exceeded the first threshold value, wherein the second period starts when the load sensed by the load sensor has fallen below the second threshold value, if the vibration controller determines, as a result of the third determination, that the load sensed by the load sensor has equaled or exceeded the first threshold value during the second period, then the vibration controller does not drive the vibration generator but returns to the second determination, and if the vibration controller determines, as a result of the third determination, that the load sensed by the load sensor does not equal or exceed the first threshold value during the second period, then after elapse of the second period, the vibration controller returns to the first determination.

16. The vibration control method according to claim 15, wherein, if the load sensed by the load sensor does not fall below the second threshold value during the first period but falls below the second threshold value after the first period has elapsed, then the vibration controller drives the vibration generator.

17. The vibration control method according to claim 16, wherein, if the load sensed by the load sensor does not fall below the second threshold value during the first period but falls below the second threshold value after the first period has elapsed, then the vibration controller drives the vibration generator.

18. The vibration control method according to claim 17, wherein after the elapse of the first period, the vibration controller makes a fourth determination, during a predetermined third period, as to whether or not a load sensed by the load sensor has equaled or exceeded the first threshold value, wherein the third period starts when the load sensed by the load sensor has fallen below the second threshold value, if the vibration controller determines, as a result of the fourth determination, that the load sensed by the load sensor has equaled or exceeded the first threshold value during the third period, then the vibration controller does not drive the vibration generator, and if the vibration controller determines, as a result of the fourth determination, that the load sensed by the load sensor does not equal or exceed the first threshold value during the third period, then after elapse of the third period, the vibration controller returns to the first determination.

* * * * *